Jan. 12, 1932.  M. D. JUSTISS  1,841,190
PISTON PIN EXTRACTOR AND INSERTER
Filed Oct. 15, 1930  2 Sheets-Sheet 1
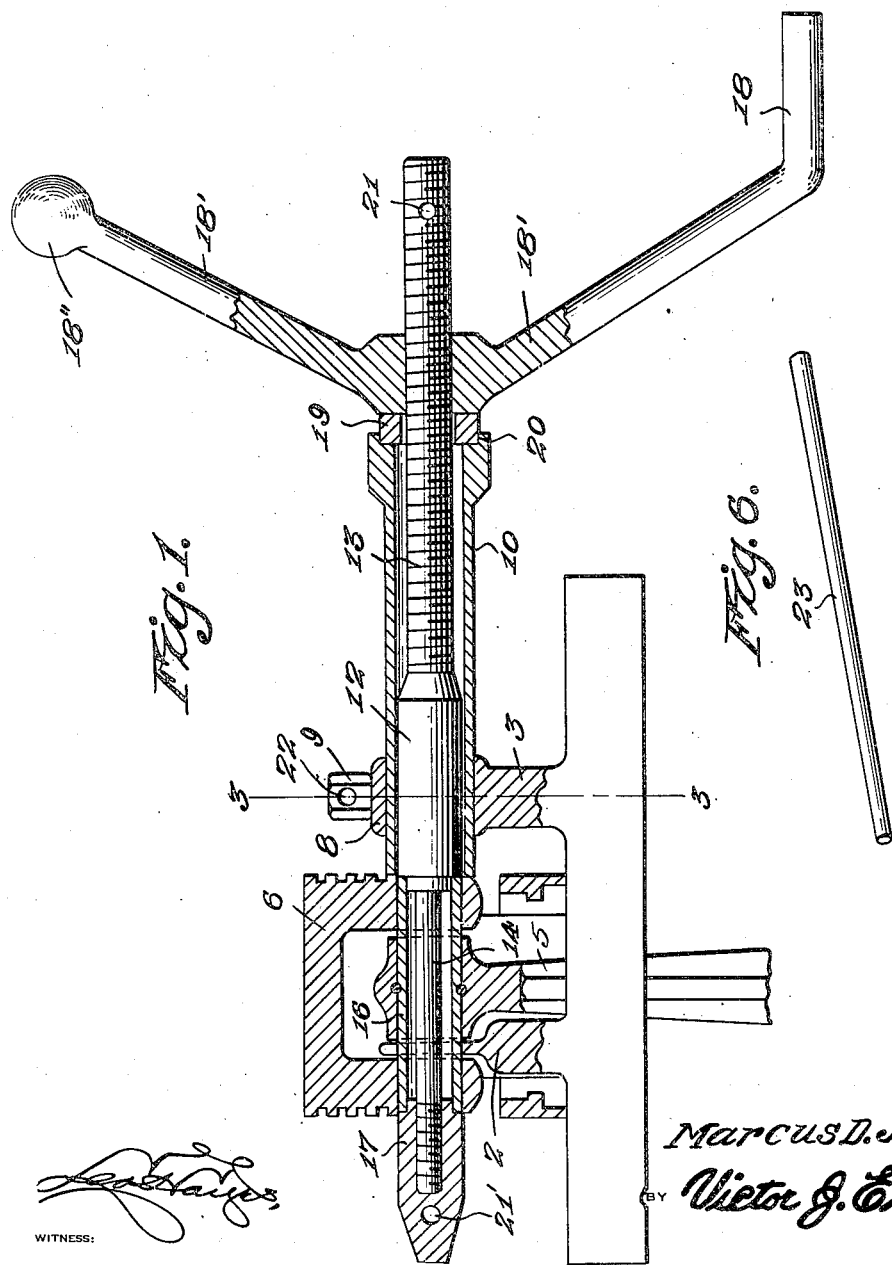

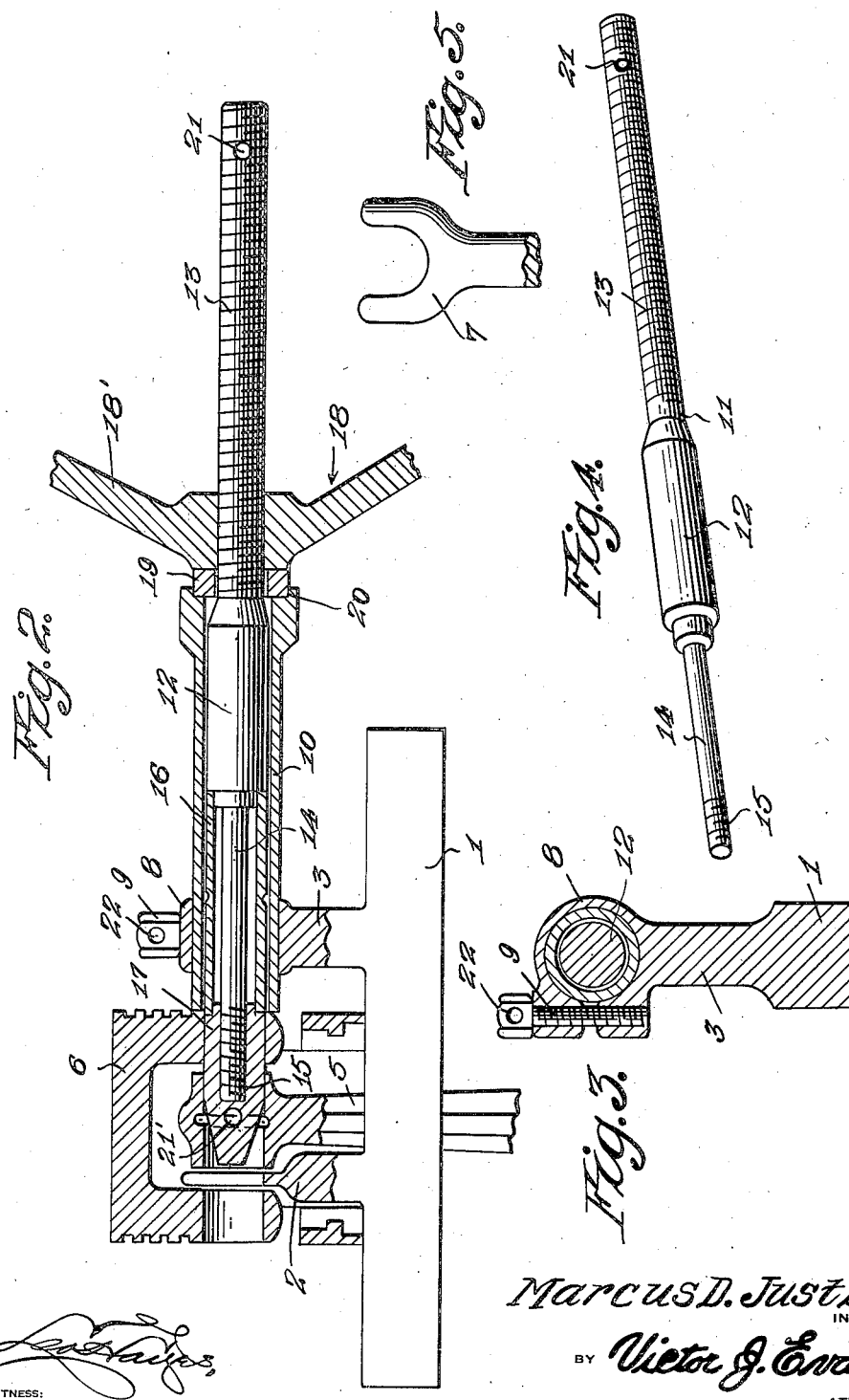

Patented Jan. 12, 1932

1,841,190

UNITED STATES PATENT OFFICE

MARCUS D. JUSTISS, OF MAGNOLIA, ARKANSAS

PISTON PIN EXTRACTOR AND INSERTER

Application filed October 15, 1930. Serial No. 488,946.

This invention relates to an extractor and inserter for piston pins, the general object of the invention being to provide a support for the piston and a part of the tool, with a threaded member having a part passing through the pin, with means for exerting pressure against the member and against the piston so as to force the pin into the piston or the pin out of the piston.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a sectional elevation, showing the device in use.

Figure 2 is a similar view, but showing the pin removed from the piston.

Figure 3 is a section on line 3—3 of Figure 1.

Figure 4 is a view of the threaded member.

Figure 5 is a side view of the forked support.

Figure 6 is a view of a rod used with the device.

In these views, the numeral 1 indicates a base which is formed with the uprights 2 and 3. The base forms a support for the piston 6, the pin of which is to be removed or inserted. The connecting rod is shown at 5. The upright 2 has a forked end of small thickness, as shown at 7, while the upright 3 is formed with a split tubular part 8, the ends of which are enlarged and provided with threaded holes to receive a bolt 9. An elongated sleeve 10 is adapted to be placed in the tubular part 8 and clamped therein by tightening the bolt 9 and the parts are so arranged that when this is done, the opening in the sleeve will be in alignment with the pin receiving opening of the piston. An elongated member 11 is formed with an enlarged intermediate part 12, a threaded part 13 and a reduced part 14 which terminates in the threaded end 15. This member is adapted to be placed in the sleeve, with the enlargement 12 therein and the reduced part 14 passing through the bore of the pin 16. A head or cap 17 is threaded on the end 15 of the part 14 to fasten the pin between the enlarged part 12 and head 17. A handle member 18 is then threaded on the part 13 and turned until it bears against a thrust washer 19 fitting in a countersink 20 in the outer end of the sleeve 10. Thus the handle will bear against the washer 19 and cause the sleeve 10 to bear against the piston and as the handle member is being rotated, it will cause the member 11 to move longitudinally away from the piston so that it will draw the piston pin therefrom, as shown in Figure 2, or if the pin is to be placed in the piston, the member 11 is passed through the hole in the piston, with the reduced part 14 extending beyond the piston so that the pin can be placed thereon and then by operating the handle, the part 11 will be moved to force the pin into the piston. The handle member is formed with the arms 18' for facilitating its rotation and one of the arms is provided with a weight 18'' which enables the handle member to be spun on the threaded part of the member 11 to quickly place it against the washer 19 or to move it outwardly on said threaded part.

The member 11 is formed with the hole 21, the member 17 with a hole 21' and the bolt 9 with the hole 22 so that a rod 23 can be placed through these holes to facilitate the turning or manipulation of said parts.

As will be seen, the upright 2 has its forked end fitting between the upper end of the connecting rod and the inner wall of the piston.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A device of the class described comprising a support, a pair of uprights thereon, one of which has a forked upper end for fitting around a piston pin when a piston is placed on the support, the other upright having a tubular clamp at its upper end, an elongated sleeve held in the clamp and having one end abutting the piston, a member having an enlarged part passing through the sleeve and having a reduced part for passing through a piston pin the said enlarged and reduced parts forming at their junction a shoulder, a head detachably connected with the end of the reduced part for holding the pin over the reduced part and between said head and shoulder, said member having its outer portion threaded and extended beyond the sleeve and a handle member threaded thereon for exerting pressure against the sleeve and for moving the threaded member longitudinally to force the pin into the piston or out of the same.

In testimony whereof I affix my signature.

MARCUS D. JUSTISS.